Figure 1:
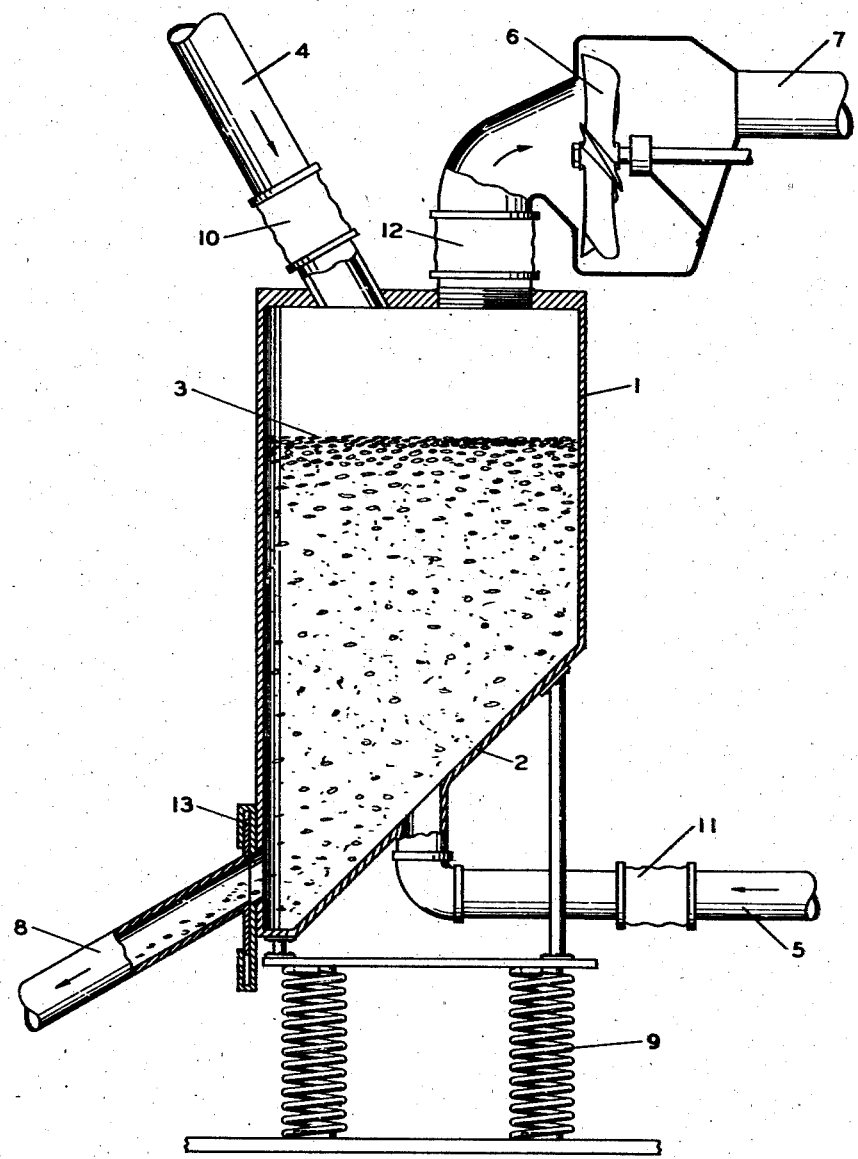

Aug. 18, 1942.　　　S. C. CARNEY　　　2,293,113
SEPARATION OF CARBON BLACK OR FINE POWDERS FROM GASES
Filed June 26, 1939　　　2 Sheets-Sheet 1

INVENTOR
S. C. CARNEY
BY
ATTORNEYS

INVENTOR
S. C. CARNEY

Patented Aug. 18, 1942

2,293,113

UNITED STATES PATENT OFFICE 2,293,113

SEPARATION OF CARBON BLACK OR FINE POWDERS FROM GASES

Samuel C. Carney, Bartlesville, Okla., assignor to Phillips Petroleum Company, a corporation of Delaware Application June 26, 1939, Serial No. 281,294

2 Claims. (Cl. 23—314)

The present invention relates to a process of separating carbon black or any other fine, dusty powder which is entrained as fine dust in a stream of gas or air. Its purpose is similar to well know devices in the art such as bags, cyclone separators, Cottrell precipitators, etc.

In recent years most carbon black plants have been equipped with some process for increasing the density of the raw black by pelleting or granulating, as for example, by use of my pelleting process, copending application, Serial No. 259,065 filed February 28, 1939.

Black so prepared is known in the trade as "dustless." Though it is relatively dustless as compared with the original material, the pelleting plants themselves are to a layman far from dustless. It has occurred to operators of such plants that if a reduced pressure equal to one or two inches of water were maintained in the pelleting or granulating apparatus and its necessary sieves and conveyors, dust incident to the pelleting process could be prevented from escaping into the building. But even when exhaust fans for this purpose have been installed but little relief was obtained because of the well known inefficiency of bag filters in collecting the very fine carbon dust.

There are also known processes for producing carbon black from gas by decomposition which leaves the carbon entrained in the gas mixture concurrently produced. In these, cyclone, bag and Cottrell precipitators are used. The cyclone is very inefficient and the gases must be cooled to a low temperature when bags are used.

My process uses as a filter medium the so-called granulated or agglomerated carbon black such as is now being produced by many plants.

The advantages of the present process and apparatus over known processes and apparatus is simplicity, low cost and self-cleaning. As compared with cyclone or bag separators, it more completely removes the carbon. As compared to the Cottrell precipitator, it is less effective but more suitable for small installations and for those cases, frequent with carbon black, where the high efficiency of the Cottrell process is not required.

The object of the present invention is to use agglomerated or pelleted carbon black as a filtering medium to remove the light flocculant carbon black from a stream of air.

It is a further object of the present invention to use agglomerated or pelleted carbon black as a filtering medium to remove carbon black from gases, both of which are produced concurrently in the decomposition process of making carbon black.

Other objects and advantages of the invention will be apparent during the course of the following description.

Figure 2:
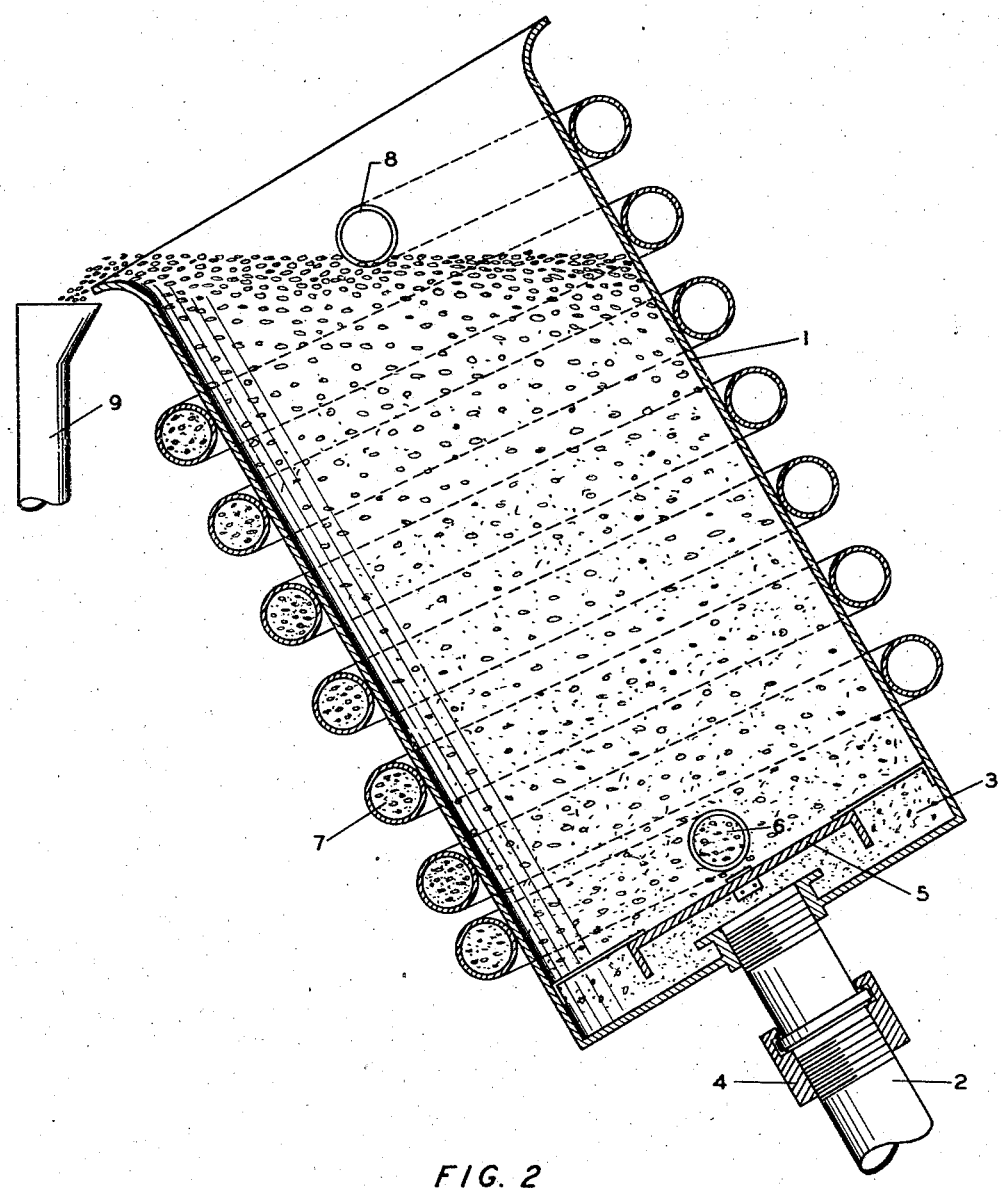

In the accompanying drawings, forming a part of this specification, and in which like numerals are employed to designate like parts throughout the same:

Figure 1 shows an elevational view partly in section, of the apparatus used in the process of separating carbon black from dust, Figure 2 shows an elevational view, partly in section, of apparatus combining the filtering process with a pelleting process.

In the drawings, wherein for the purpose of illustration, is shown a preferred embodiment of my invention, Figure 1 shows an installation suitable for the simpler case of relatively small volume of air or other gas as would result from maintaining reduced pressure by an exhaust fan on the mechanism of an agglomerating process, for example, that of my copending application Serial No. 259,065, filed February 28, 1939. The numeral 1 represents a chamber of suitable shape and size with bottom 2 having a slope equal to or greater than the angle of repose of the carbon aggregates used as the filter medium. In operation, it is automatically kept filled to the level 3 with aggregates commercially free from dust preferably those which have been sifted from a commercial product as greater than the maximum size and which are thus moving toward further processing, for example, to be broken down in the seedmill of my copending application above mentioned.

The aggregates are supplied continuously to chamber 1 through the pipe 4 which connects into a pelleting process of any type. Through the pipe 5 there enters a stream of air induced by the suction of exhaust fan 6. The line 5 connects to various units of the pelleting process and the volume of air drawn through it is such as will maintain a slightly reduced pressure on the entire pelleting apparatus and will carry with it the fine carbon dust incident to a pelleting process.

The fine dust is caught and held on the surface of the moving carbon granules in container 1 and the relatively clean air is discharged through the pipe 7. By any suitable automatic arrangement, carbon granules which have been coated with dust are withdrawn through pipe 8 to be further processed. The automatic means disclosed in the drawing shows the container 1 mounted on flexible spring means 9 with flexible sections 10, 11, and 12 included in the pipes 4, 5, and 7. These sections are well known in the art and may be made of fabric with an internal helical spring coil as a reenforcing. Discharge pipe 8 is fixed in a stationary position and makes junction with chamber 1 by the slide valve 13. If carbon pellets flow out through pipe 8 at too great a rate, the weight of chamber 1 is reduced as its contents become less and springs 9 are so tensioned that they extend lifting chamber 1 with them and thus reduce the opening at slide valve 13. The rate of control shown is to be taken as a preferred example only as numerous other means are possible for effecting the same result and applicant does not wish to limit himself to the one means here shown.

Figure 2 shows the same invention with inclusion of the step of continuously reconditioning the carbon aggregates of the filter bed. It is adapted for the first means of recovery of carbon black entrained in a stream of gas as produced by a decomposition process, as distinguished from the known channel process. In effect, it combines the separation from the gas stream with a pelleting process. By this means the low density black has its density brought up in the separating process.

The numeral 1 represents a cylindrical chamber having in practice a diameter on the order of six feet and is suitably inclined from the vertical position with reference to the angle of repose of carbon agglomerates. It is mounted on trunnions and arranged to rotate about its central axis. The pipe 2 carries gas containing entrained fine carbon black into the space 3 in the end of the chamber. The pipe 2 has a swivel joint 4 which allows the chamber 1 to rotate and the pipe 2 to remain stationary. The end of pipe 2 within the space 3 is so covered by cup 5 that carbon aggregates will not roll into pipe 2 from the chamber 1. The lower end of the Archimedes spiral tube 7 is represented at 6 and the tube 7 encircles the outside surface of the chamber 1 and the opening 6 communicates with the inside of the chamber 1. The upper end of the spiral tube 7 again communicates with the interior of chamber 1 at 8. Thus the extremely fine material entering the chamber 1 through the air stream passing through 2 from the decomposition process is caught on the surface of the carbon agglomerates with which the chamber 1 is initially filled. As opening 6 comes to the bottom position, agglomerates will flow into the Archimedes spiral and will cease flowing as opening 6 comes to the upper position. Only the lower part of each coil of the spiral thus contains agglomerates which are carried upward and discharged back into the top of the chamber 1 through opening 8. On the passage upward through the spiral the fine dust collected in the bottom of the chamber 1 from the gas stream will be tightly agglomerated on the previously formed granules and when reintroduced at the top constitute a fresh filter bed constantly fed downwardly. The mechanism of this agglomeration is the same as the Archimedes spiral described in my copending application Serial No. 274,003 filed May 16, 1939.

Seed as described in this prior application may also be introduced at the top of the chamber 1 in amount sufficient to form a commercial range of sizes. As the content of cylinder 1 is thus being added to from the gas stream and the added seed, it will continuously overflow into downpipe 9, the overflow being the crude product which is removed from commercial finishing and classification in the known manner.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described my invention, I claim:

1. The process of separating from a stream of gas carbon black entrained therein as a dust and then continuously agglomerating said separated carbon black to form granules of carbon black which comprises, passing the stream of gas through a filter bed of granules of carbon black, removing from the bottom of the filter bed a mixture of granules and raw carbon black, agglomerating the raw carbon black to the granules by subjecting the granules and raw carbon black to relative movement, elevating the mixture to the top of the filter bed and discharging the granules onto the top of the filter bed.

2. The process of separating from a stream of gas carbon black entrained therein as a dust and then continuously agglomerating said separated carbon black to form granules of carbon black which comprises, passing the stream of gas through a filter bed of granules of carbon black, removing from the bottom of the filter bed a mixture of granules and raw carbon black, agglomerating the raw carbon black to the granules by subjecting the granules and raw carbon black to relative movement while simultaneously elevating the mixture to the top of the filter bed and discharging the granules from the agglomerating and elevating step onto the top of the filter bed.

SAMUEL C. CARNEY.